(12) United States Patent
Takayama et al.

(10) Patent No.: US 8,213,272 B2
(45) Date of Patent: Jul. 3, 2012

(54) MULTILAYERED WAVEGUIDE HAVING PROTRUDED LIGHT-EMITTING END

(75) Inventors: Seiichi Takayama, Tokyo (JP); Satoshi Tomikawa, Tokyo (JP); Toshiyuki Ayukawa, Tokyo (JP); Daisuke Miyauchi, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 451 days.

(21) Appl. No.: 12/482,851

(22) Filed: Jun. 11, 2009

(65) Prior Publication Data

US 2010/0315736 A1    Dec. 16, 2010

(51) Int. Cl.
*G11B 11/00*    (2006.01)

(52) U.S. Cl. ............ 369/13.33; 369/112.27; 360/125.31

(58) Field of Classification Search ................ 369/13.33, 369/13.32, 13.24, 13.14, 13.03, 13.02, 13.12, 369/112.27, 112.09, 112.14, 112.21, 112.01; 360/59, 313, 245.3, 126, 123.17, 125.31, 360/128, 125.74, 125.02

See application file for complete search history.

(56) References Cited

U.S. PATENT DOCUMENTS

| | | | |
|---|---|---|---|
| 5,949,572 A | 9/1999 | Kouta | |
| 6,649,894 B2 | 11/2003 | Matsumoto et al. | |
| 6,768,556 B1 | 7/2004 | Matsumoto et al. | |
| 7,106,664 B2 | 9/2006 | Hasegawa et al. | |
| 7,538,978 B2 * | 5/2009 | Sato et al. | ...................... 360/128 |
| 7,885,029 B2 * | 2/2011 | Miyauchi et al. | ............... 360/59 |
| 8,000,178 B2 * | 8/2011 | Shimazawa et al. | ........ 369/13.33 |
| 8,065,786 B2 * | 11/2011 | Shimazawa et al. | ........ 29/603.12 |
| 2006/0187564 A1 | 8/2006 | Sato et al. | |
| 2008/0239541 A1 | 10/2008 | Shimazawa et al. | |

FOREIGN PATENT DOCUMENTS

| | | |
|---|---|---|
| JP | 2002-277376 | 9/2002 |
| JP | 2003-57465 | 2/2003 |

* cited by examiner

*Primary Examiner* — Ali Neyzari
(74) *Attorney, Agent, or Firm* — Frommer Lawrence & Haug LLP

(57) ABSTRACT

A waveguide is provided, in which the optical coupling efficiency to a light source is sufficiently high, and the light-emitting spot center is stably provided at the intended position. The waveguide comprises a multilayered structure in which refractive indexes of layers having a surface contact with each other are different from each other. The multilayered structure is divided into a plurality of groups, and the length from the light-receiving end surface to the light-emitting end surface of one group is different from that of the neighboring group, and the protruded light-emitting end surface of the first group defined as a group that has the largest length includes a center of the light-emitting spot. In this waveguide, the state in which the light-emitting spot center is positioned within the light-emitting end surface does not easily be changed, even when the light-receiving spot center within the light-receiving end surface is rather displaced.

12 Claims, 9 Drawing Sheets

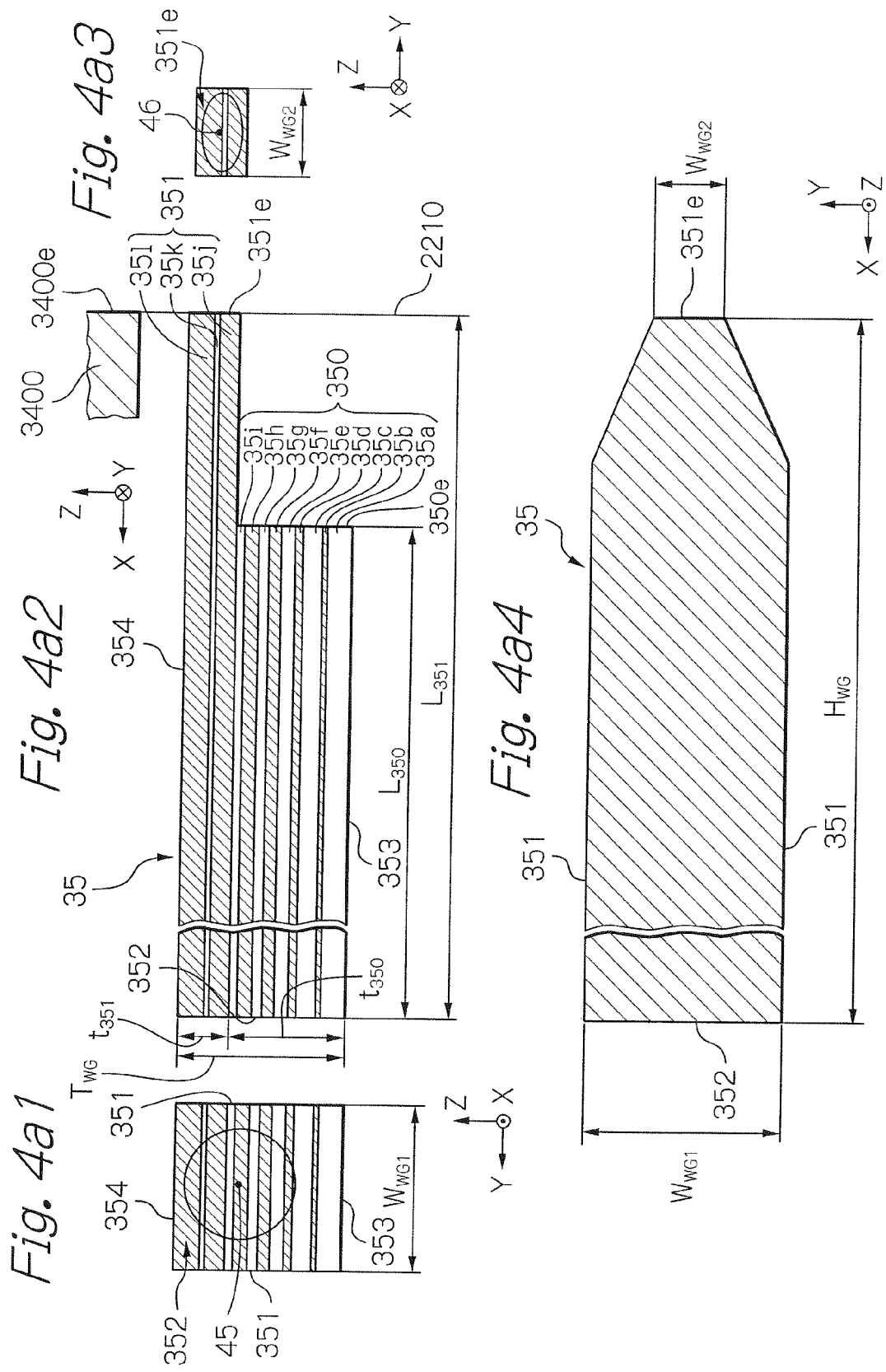

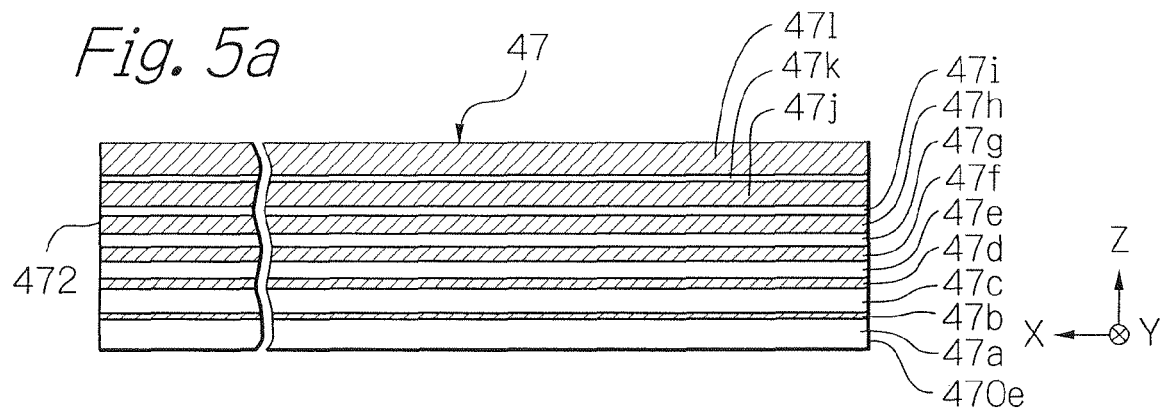
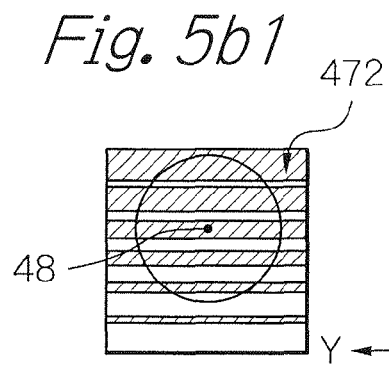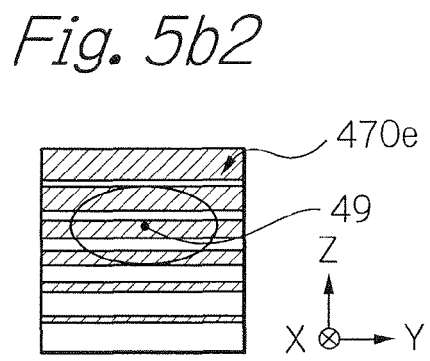
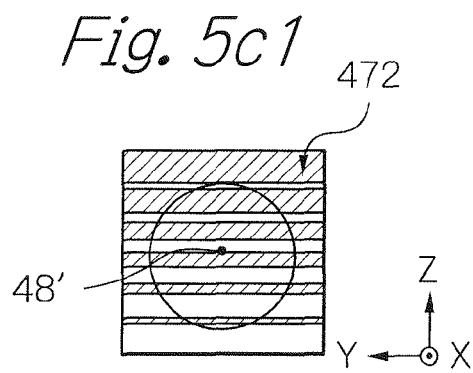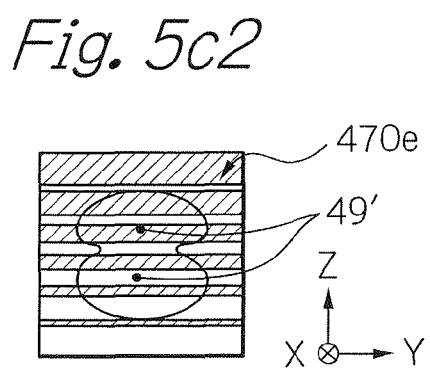
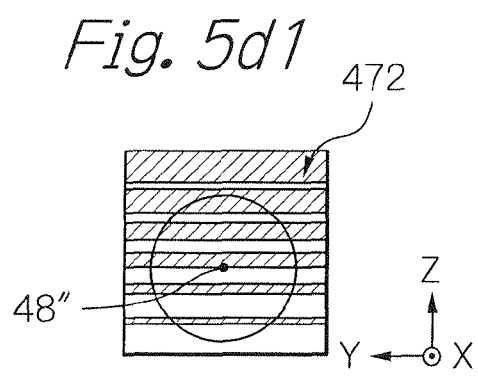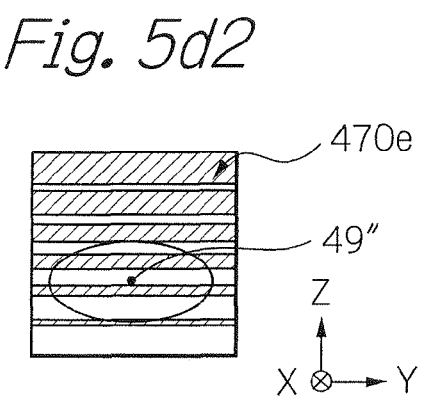

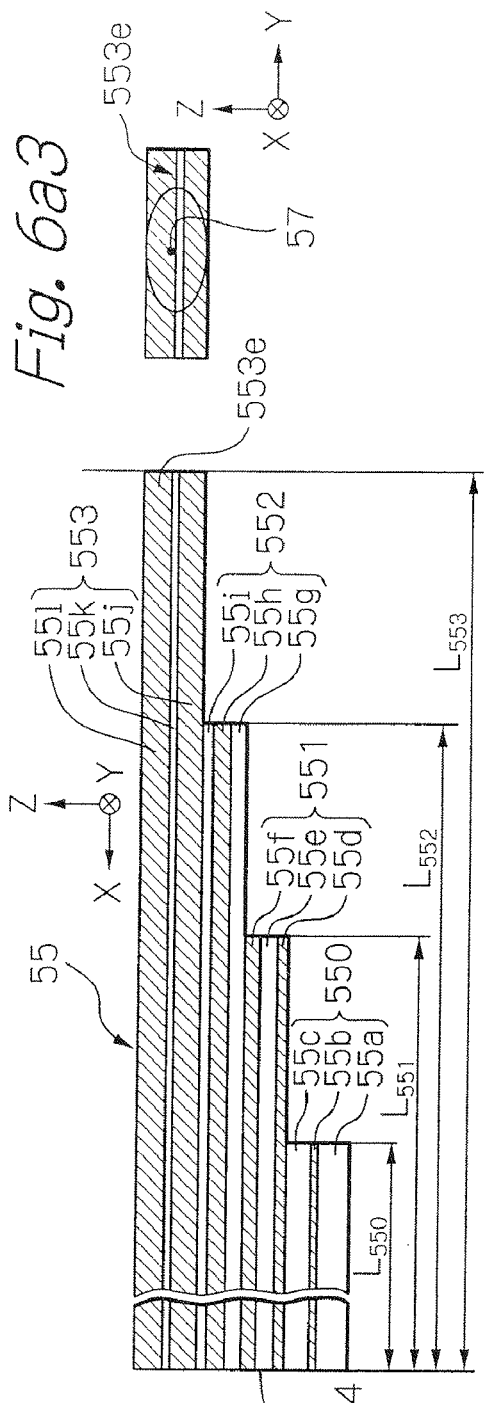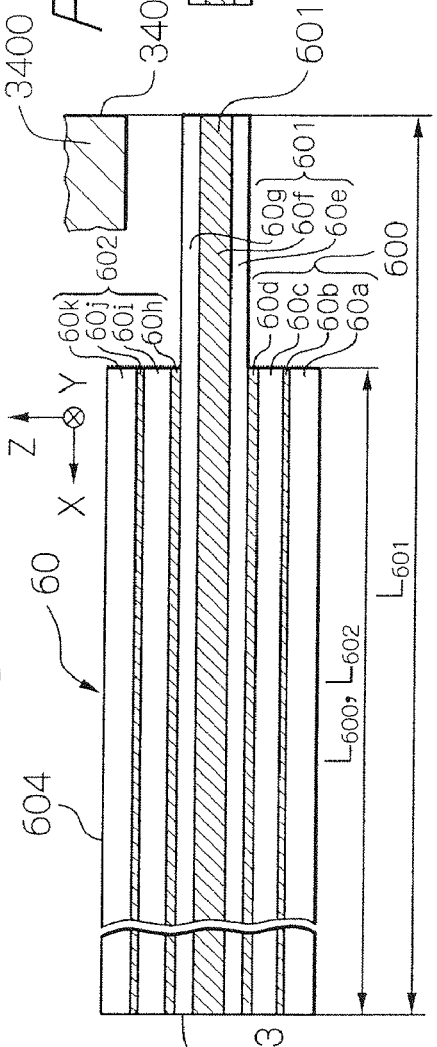

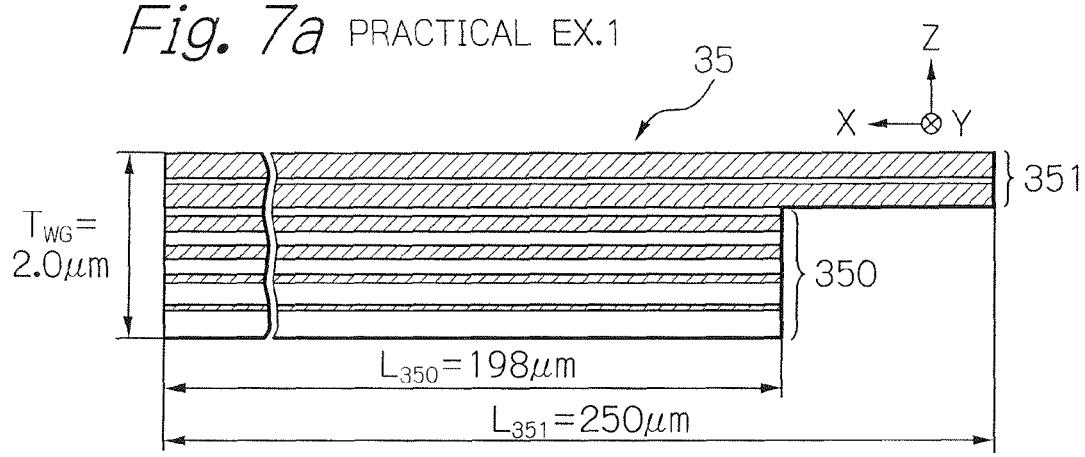
Fig. 7a PRACTICAL EX.1
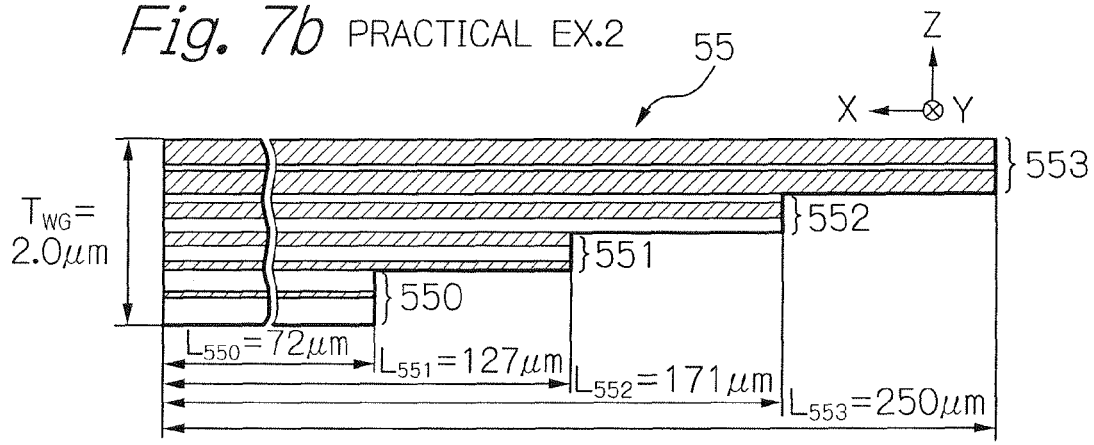
Fig. 7b PRACTICAL EX.2
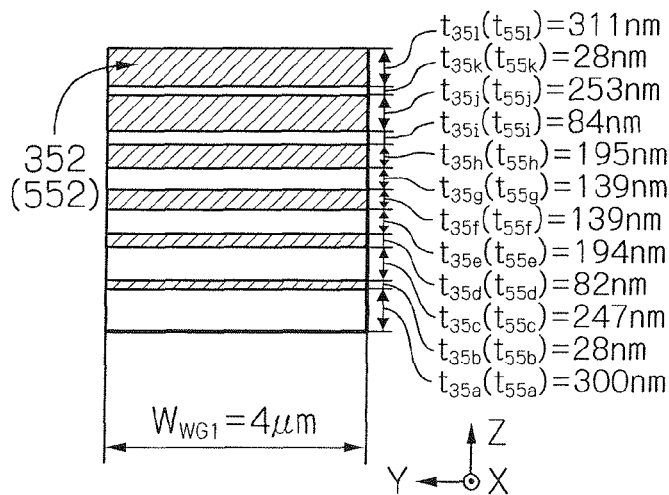
Fig. 7c1 PRAC. EXs. 1&2
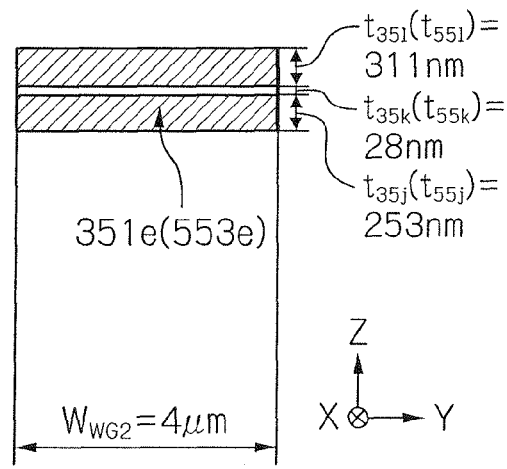
Fig. 7c2 PRAC. EXs. 1&2

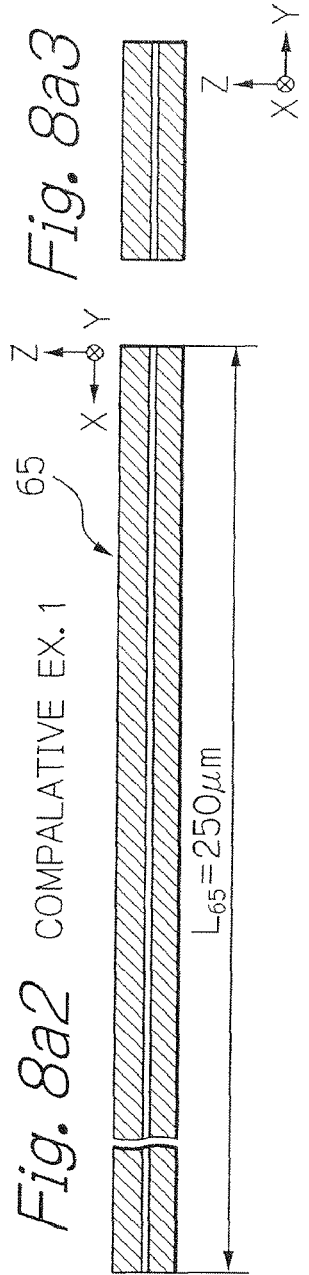
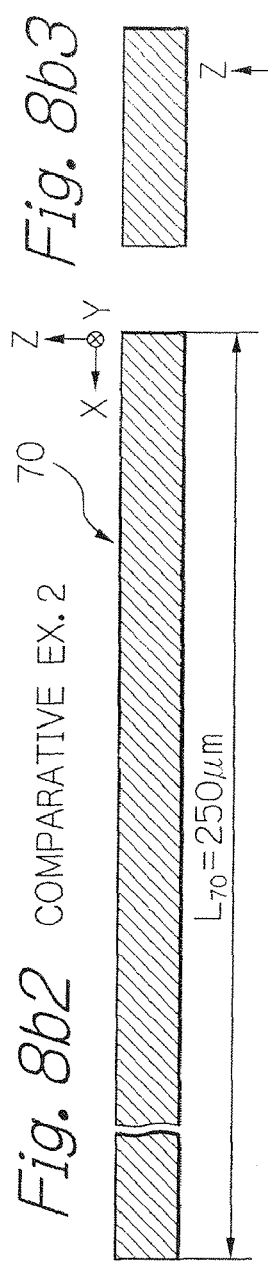
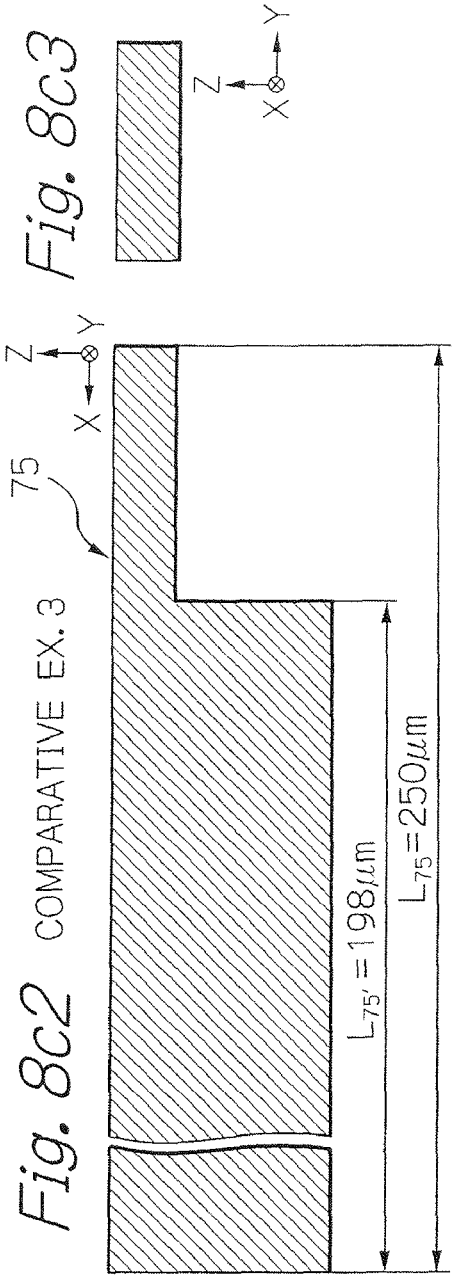

MULTILAYERED WAVEGUIDE HAVING PROTRUDED LIGHT-EMITTING END

BACKGROUND OF THE INVENTION

1. Field of the Invention

The present invention relates to a waveguide which guides light to an intended position, and to a thermally-assisted magnetic recording head which writes data by leading a light for thermal-assist to the opposed-to-medium surface side of the head by means of the waveguide.

2. Description of the Related Art

As the recording density of a magnetic recording apparatus becomes higher, as represented by a magnetic disk apparatus, further improvement has been required in the performance of a thin-film magnetic head and a magnetic recording medium. Especially, in the magnetic recording medium, it is necessary to decrease the size of magnetic microparticles that constitutes the magnetic recording layer of the medium, and to reduce irregularity in the boundary of record bit in order to improve the recording density. However, the decrease in size of the magnetic microparticles raises a problem of degradation in thermal stability of the magnetization due to the decrease in volume.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium, where data is to be written; just after that, writing is performed by applying write field to the heated portion.

The heating of the portion to be written of the medium is performed by irradiating the portion with near-field light or with laser light. In the case of heating with near-field light, as described in, for example, U.S. Pat. No. 6,768,556 and U.S. Pat. No. 6,649,894, a near-field light generator as a conductive plate, so-called a plasmon antenna, is provided on the opposed-to-medium surface, then near-field light is generated by irradiating the opposite side to the opposed-to-medium surface of the plasmon antenna with laser light guided through a waveguide. In the case of heating with laser light, the magnetic recording medium is directly irradiated with laser light guided through a waveguide. In this way, a waveguide is an important component in any case.

In the thermally-assisted magnetic recording head, the waveguide and a main magnetic pole of the write head element for generating write magnetic field (write field) are disposed close to each other. For example, the thermally-assisted magnetic recording that uses the plasmon antenna applies thermal-dominant technique in which spatial resolution of record bits depends on the spot diameter of near-field light. Therefore, temperature gradient adjacent to the irradiating center of near-field light becomes significantly large. While, magnetic-field gradient of write field generated from the main magnetic pole is set to be considerably large according to the higher recording density. As a result, in writing record bits, the irradiating center of near-field light, or the plasmon antenna, is required to be sufficiently close to the main magnetic pole in order to obtain a write field with sufficient intensity near the irradiating center. Accordingly, the position of the emitting spot center of light propagating through the waveguide must be set to be sufficiently close to the main magnetic pole.

Whereas, also in the case of directly irradiating the magnetic recording medium with laser light guided through a waveguide, a sufficient intensity of write field must be applied to the laser light spot center and its neighborhood in order to write record bits. For this purpose, the position of the emitting spot center of light propagating through the waveguide must be set to be sufficiently close to the main magnetic pole.

The methods for setting the position of the emitting spot center of light propagating through the waveguide to be sufficiently close to the main magnetic pole include: 1) reducing the thickness in the stacking direction of the waveguide; and 2) using a waveguide with multilayered structure. The method 2) intends to control the position of the light spot center on the light-emitting end of the waveguide by appropriately designing the refractive index of each layer in the multilayered structure. However, in the case of the method 1), the reduction of the total thickness causes the thickness of the light-receiving end where the waveguide receives laser light from a light source to become smaller. As a result, optical coupling efficiency between the light source such as a laser diode and the waveguide is degraded, that is, the optical coupling loss therebetween is increased; thus it may become difficult to introduce a sufficient intensity of light into the waveguide. Further, in the case of the method 2), the position of the light spot center on the light-emitting end deviates significantly from the intended position due to a slight displacement of the light source in relation to the light-receiving end of the waveguide. Therefore, there may be a difficult problem that the position accuracy of the light source in relation to the light-receiving end must be sufficiently high.

SUMMARY OF THE INVENTION

Some terms used in the specification will be defined before explaining the present invention. In a layered structure or an element structure formed in the element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to the trailing side and −Z side to the leading side. And Y-axis direction indicates the track width direction, and X-axis direction indicates the height direction.

According to the present invention, a waveguide is provided, which comprises a multilayered structure in which refractive indexes of layers having a surface contact with each other are different from each other. And the multilayered structure is divided into a plurality of groups, and the length from the end surface on the light-receiving side of the waveguide to the end surface on the light-emitting side of one group is different from that of the neighboring group, and the protruded end surface on the light-emitting side of the first group defined as a group that has the largest length includes a center of the light-emitting spot of light propagating through the waveguide.

In the above-described waveguide, the state in which the light-emitting spot center is positioned within the end surface on the light-emitting side does not easily be changed, even when the position of light-receiving spot center within the end surface on the light-receiving side is rather displaced. As a result, the optical coupling efficiency between the waveguide and a light source can be made sufficiently high, and the light-emitting spot center of light propagating through the waveguide can be stably set to be at the intended position. Further, improved is the light use efficiency.

In the waveguide according to the present invention, the average refractive index of the first group is preferably the highest in average refractive indexes of the plurality of groups. And the layers having a first refractive index and the layers having a second refractive index that is higher than the first refractive index are preferably alternately stacked. Further, the length of a group other than the first group is preferably as large as an integral multiple of a pitch of the light in the waveguide. Here, the laser light (waveguide light) propagating within the waveguide generally shows an aspect in which the waveguide light proceeds in waves with a period depending on the shape and size of the waveguide. The above-described pitch is equal to this period.

Further, the first group preferably lies at an end in stacking direction within the waveguide. For example, in the case of using a thermally-assisted magnetic recording head in which a write head element comprises a magnetic pole that generates write magnetic field and reaches the opposed-to-medium surface, by setting the first group to lie at the end in stacking direction on the magnetic pole side within the waveguide, the light-emitting spot center of the light propagating through the waveguide can be provided sufficiently adjacent to the magnetic pole. Thereby, there can be performed a satisfactory thermally-assisted magnetic recording. Furthermore, in the above-described waveguide, it is preferable that the multilayered structure is divided into the first group and the second group, and the average refractive index of the first group is higher than the average refractive index of the second group. Further, it is also preferable that the first group has a structure in which a layer having the second refractive index, a layer having the first refractive index that is lower than the second refractive index, and a layer having the second refractive index are sequentially stacked.

Further, in the case that the first group lies at the end in stacking direction on the magnetic pole side within the waveguide, it is also preferable that the multilayered structure is divided into the first group and the other plurality of groups, the average refractive index of the first group is higher than any of average refractive indexes of the other plurality of groups, and lengths of the other plurality of groups become smaller sequentially from the first group side.

According to the present invention, a thermally-assisted magnetic recording head is further provided, which comprises, in the element-formation surface of a substrate: a write head element for writing data into a magnetic recording medium; and the above-described waveguide.

In the head according to the present invention, the end surface on the light-emitting side of the first group preferably reaches the opposed-to-medium surface. Further, it is also preferable that a light source is provided on the opposite side to the opposed-to-medium surface of the head, and the end surface on the light-receiving side of the waveguide reaches the end surface of the head opposite to the opposed-to-medium surface, and is provided in a position where a light emitted from the light source can be received.

According to the present invention, a head gimbal assembly (HGA) is further provided, which comprises a suspension and the above-described thermally-assisted magnetic recording head fixed on the suspension.

According to the present invention, a magnetic recording apparatus is further provided, which comprises: at least one HGA described above; at least one magnetic recording medium; and a recording and light-emission control circuit for controlling emission operation of the light propagating through the waveguide, and for controlling write operation that the thermally-assisted magnetic recording head performs to the at least magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 4a1 to 4a4 show views of both end surfaces, a cross-sectional view and a top view schematically illustrating one embodiment of the waveguide according to the present invention;

FIGS. 5a to 5d2 show views of both end surfaces and a cross-sectional view schematically illustrating a comparative example of waveguide;

FIGS. 6a1 to 6a3 show views of both end surfaces and cross-sectional views schematically illustrating another embodiment of waveguide according to the present invention;

FIGS. 6b1 to 6b3 show views of both end surfaces and cross-sectional views schematically illustrating another embodiment of waveguide according to the present invention;

FIGS. 7a to 7c2 show schematic views illustrating the structures of waveguides used for practical examples 1 and 2; and FIGS. 8a1 to 8c3 show schematic views illustrating the structures of waveguides used for comparative examples 1 to 3.

DESCRIPTION OF THE PREFERRED EMBODIMENTS

Figure 1:
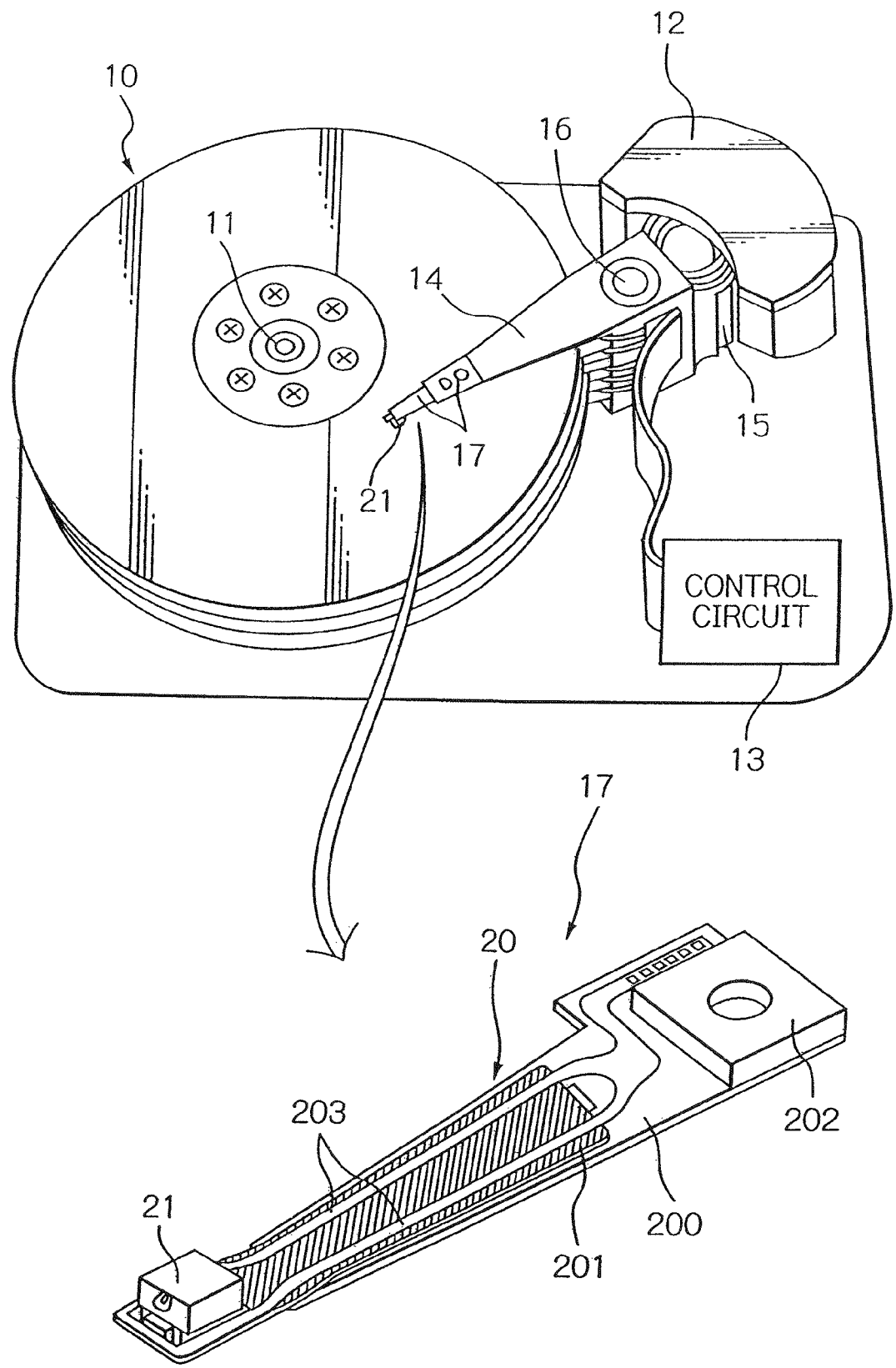
FIG. 1 shows a perspective view schematically illustrating one embodiment of a magnetic recording apparatus and an HGA according to the present invention.

FIG. 1 shows a perspective view schematically illustrating one embodiment of a magnetic recording apparatus and an HGA according to the present invention. Here, in the perspective view of the HGA, the side of the HGA opposed to the surface of the magnetic recording medium is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which record bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
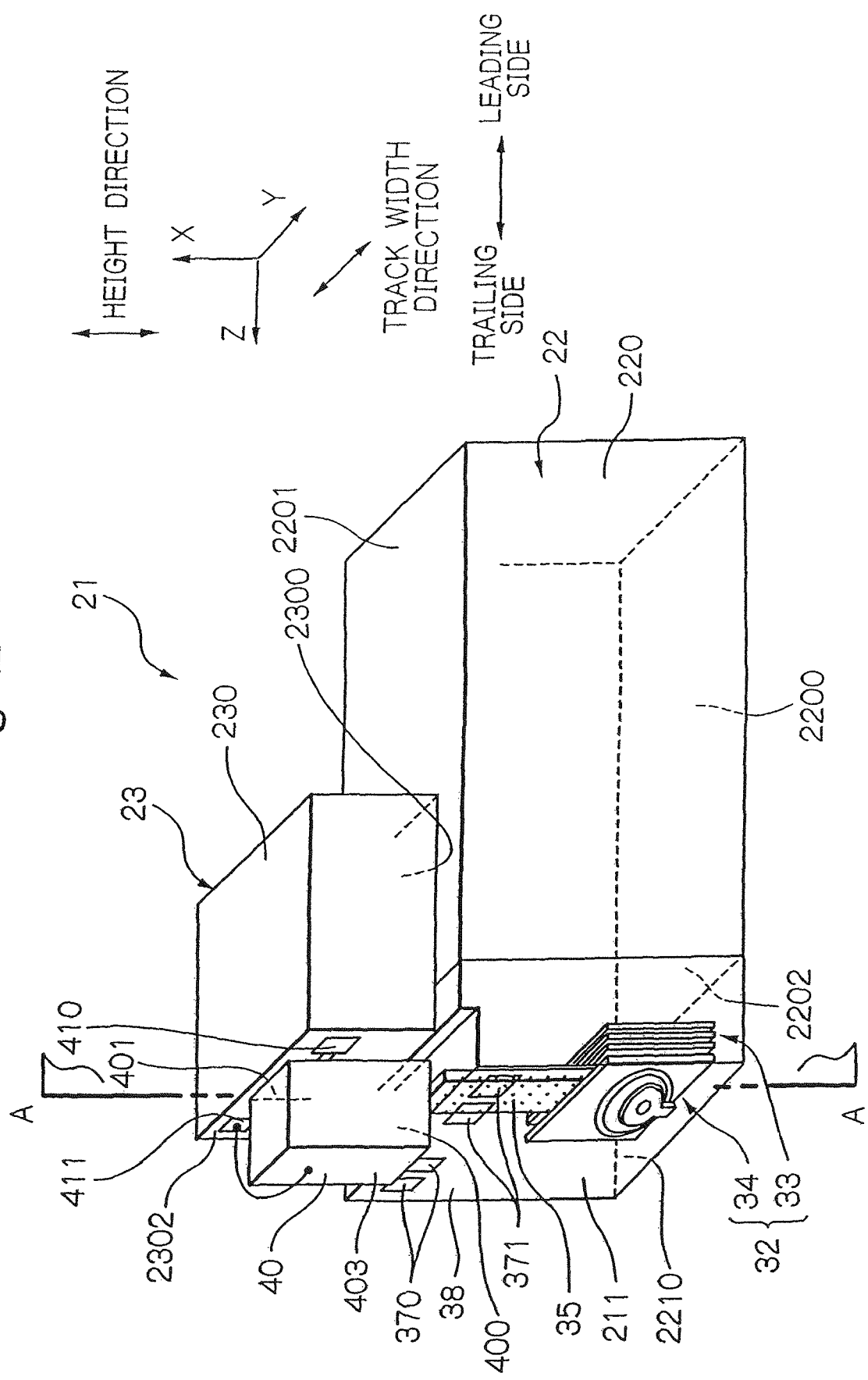
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is directly mounted on the slider 22 instead of using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from the laser diode 40 provided in the light source unit 23 to the opposed-to-medium surface side; an overcoat layer 38 formed on the element-formation surface 2202, so as to cover the MR element 33, the electromagnetic transducer 34 and the waveguide 35; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the waveguide 35 reach (extend to) the head part end surface 2210, which is an opposed-to-medium surface of the head part 221. The head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, a portion of the magnetic recording layer of the magnetic disk is irradiated and heated with laser light propagating from the laser diode 40 of the light source unit 23 through the waveguide 35. As a result, the anisotropic magnetic field of the portion is decreased to a value that enables writing. Then, thermally-assisted magnetic recording is accomplished by applying write magnetic field (write field) to the portion with decreased anisotropic magnetic field of the magnetic recording layer. Alternatively, a near-field light generator having an end reaching the head part end surface 2210, so-called a plasmon antenna may be provided at the position of the light-emitting end of the waveguide 35. In this case, the plasmon antenna is irradiated with the laser light that has propagated through the waveguide 35, thus near-field light is generated from the plasmon antenna; then, a portion of the magnetic recording layer is irradiated and heated with the near-field light.

Figure 3:
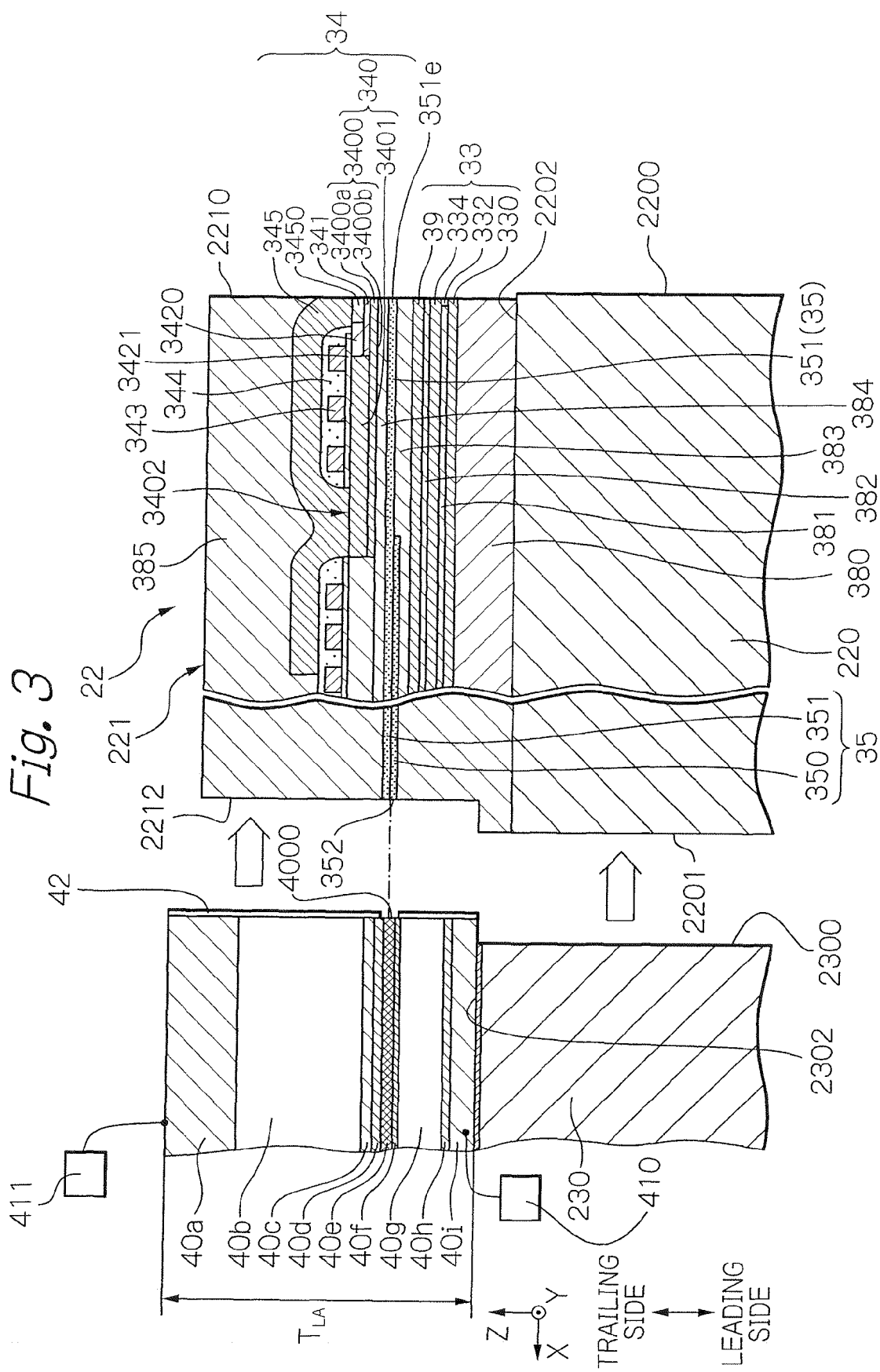
FIG. 3 shows a cross-sectional view taken by plane A in FIG. 2, schematically illustrating a main part of the thermally-assisted magnetic recording head.

FIG. 3 shows a cross-sectional view taken by plane A in FIG. 2, schematically illustrating a main part of the thermally-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Also as shown in FIG. 3, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is formed on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a double-layered structure in which a main magnetic pole 3400 and a main pole body 3401 are sequentially stacked. The main magnetic pole 3400 is isolated from its surroundings by the insulating layer 384. The main magnetic pole 3400 includes: a main tip portion 3400a reaching the head part end surface 2210 and having a small width $W_P$ (FIG. 4b) in the track width direction; and a main rear portion 3400b positioned on the rear side from the main tip portion 3400a and having a larger width than that of the portion 3400a in the track width direction. The small width $W_P$ of the main tip portion 3400a enables a minute write field to be generated, thereby setting the track width to a very small value corresponding to higher recording density.

Both of the main magnetic pole 3400 and the main pole body 3401 are preferably formed of a soft-magnetic material, for example, of an iron alloy containing Fe as a main component, such as FeNi, FeCo, FeCoNi, FeN or FeZrN. Further, the main magnetic pole 3400 preferably has a saturation magnetic flux density equal to or higher than that of the main pole body 3401. The thickness of the main magnetic pole 3400 is, for example, in the range of 0.1 to 0.8 µm. Further, the gap layer 341 forms a gap for separating the main magnetic pole layer 340 from the write shield layer 345 in the region near the head part end surface 2210. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the distance between the main magnetic pole layer 340 and the write shield layer 345, and is, for example, in the range of approximately 0.01 to 0.5 µm.

The write coil layer 343 is formed on an insulating layer 3421 made of an insulating material such as $Al_2O_3$ (alumina), in such a way as to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is made of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

Also referring to FIG. 3, the write shield layer 345 is an auxiliary magnetic pole that reaches the head part end surface 2210, and acts as a magnetic path for the magnetic flux returning from a soft-magnetic under layer that is provided under the magnetic recording layer of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head part end surface 2210, and acts for receiving the magnetic flux spreading from the main magnetic pole layer 340. In the present embodiment, the trailing shield 3450 is planarized together with the insulating layer 3420 and the main pole body 3401, and has a width in the track width direction larger than the width of the main pole body 3401 as well as than the main magnetic pole 3400. This trailing shield 3450 causes the magnetic-field gradient between the end portion of the trailing shield 3450 and the main magnetic pole 3400 to become steeper. As a result, the jitter of signal output becomes smaller; therefore, error rates during read operation can be reduced. The write shield layer 345 is formed of a soft-magnetic material. Especially, the trailing shield 3450 is formed of a material with high saturation magnetic flux density such as NiFe (Permalloy) or is formed of such an iron alloy as the main magnetic pole 3400 is formed of.

Referring to FIG. 3, the waveguide 35 is located between the MR element 33 and the electromagnetic transducer 34, that is, on the leading side (−Z side) of the electromagnetic transducer 34. Further, the waveguide 35 is disposed in parallel with the element-formation surface 2202, and extends, from an rear-end surface 352 that reaches the head part end surface 2212 opposite to the ABS 2200, to an end surface 351e that reaches the head part end surface 2210. Furthermore, the waveguide 35 is formed on an insulating layer 383, and is covered with the insulating layers 383 and 384 that play a role of a clad for the laser light propagating through the waveguide 35. The waveguide 35 itself acts as a core. The waveguide 35 according to the present invention has a multilayered structure that is divided into a layer group 350 and a layer group 351, and the end surface 351e on the light-emitting side of the layer group 351 is protruded, and includes the center of light-emitting spot of laser light. The structure and location of the waveguide 35 will be explained in detail later with reference to FIGS. 4a1 to 4b.

Further, as is in the present embodiment, an inter-element shield layer 39 is preferably provided between the MR element 33 and the electromagnetic transducer 34 (waveguide 35), sandwiched between the insulating layers 382 and 383. The inter-element shield layer 39 may be formed of a soft-magnetic material, and plays a role for shielding the MR element 33 from the magnetic field generated from the electromagnetic transducer 34. Further, though not shown in the figure, a backing coil portion may be provided between the inter-element shield layer 39 and the waveguide 35 to suppress wide adjacent track erasure (WATE) phenomenon.

Also according to FIG. 3, the light source unit 23 includes: a unit substrate 230; a laser diode 40 provided on the source-installation surface 2302 of the unit substrate 230; a terminal electrode 410 electrically connected to a p-electrode 40i of the laser diode 40; and a terminal electrode 411 electrically connected to an n-electrode 40a of the laser diode 40. The terminal electrodes 410 and 411 are electrically connected to the connection pads of the wiring member 203 provided on the flexure 201 (FIG. 1). By applying a predetermined voltage between the electrodes 410 and 411 of the laser diode 40, laser light is emitted from the emission center 4000 on an emission surface 400 of the laser diode 40.

A light source such as InP base, GaAs base or GaN base diode can be utilized as the laser diode 40, which is usually used for, for example, communication, optical disk storage or material analysis. Here, the thermally-assisted magnetic recording head 21 according to the present invention heats a magnetic recording medium without depending on the use of a near-field light generator. Therefore, there is no restriction on usable wavelength of the laser light which depends on the kind of constituent material of the near-field light generator. This extends the range of the choices for wavelength $\lambda_L$ of the emitted laser light. Actually, the wavelength $\lambda_L$ may be, for example, in the range of approximately 375 nm (nanometers) to 1.7 µm. Specifically, for example, a laser diode of InGaAsP/InP quaternary mixed crystal can also be used, in which possible wavelength region is set to be from 1.2 to 1.67 µm. In the present embodiment, the laser diode 40 has a multilayered structure including an n-electrode 40a, an n-GaAs substrate 40b, an n-InGaAlP clad layer 40c, the first InGaAlP guide layer 40d, an active layer 40e formed of multiquantum well (InGaP/InGaAlP) or the like, the second InGaAlP guide layer 40f, an p-InGaAlP clad layer 40g, p-electrode base layer 40h, and p-electrode 40i. On the front and rear cleaved surfaces of the multilayered structure, respectively formed are reflective layers for exciting the oscillation by total reflection. The reflective layer 42 has an opening in the position of the active layer 40e including the light-emission center 4000. Here, the laser diode 40 may have a thickness $T_{LA}$ of, for example, approximately 60 to 200 µm. Further, in the case without using a near-field light generator as the present embodiment is, the laser light emitted from the laser diode 40 is not required to have a particular polarization.

Further, an electric source provided within the magnetic disk apparatus can be used for driving the laser diode 40. In fact, the magnetic disk apparatus usually has an electric source with applying voltage of, for example, approximately 2 to 5 V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the n-electrode 40a may be fixed to the source-installation surface 2302 of the unit substrate 230 by turning the electrodes of the laser diode 40 upside down. Further, alternatively, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, for example, in which the width in the track width direction is 425 µm; the length is 300 µm; and the thickness is 300 µm. By joining the above-described light source unit 23 and slider 22, there is constituted the thermally-assisted magnetic recording head 21. In the joining, the joining surface 2300 of the unit substrate 230 is made to have a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4B:
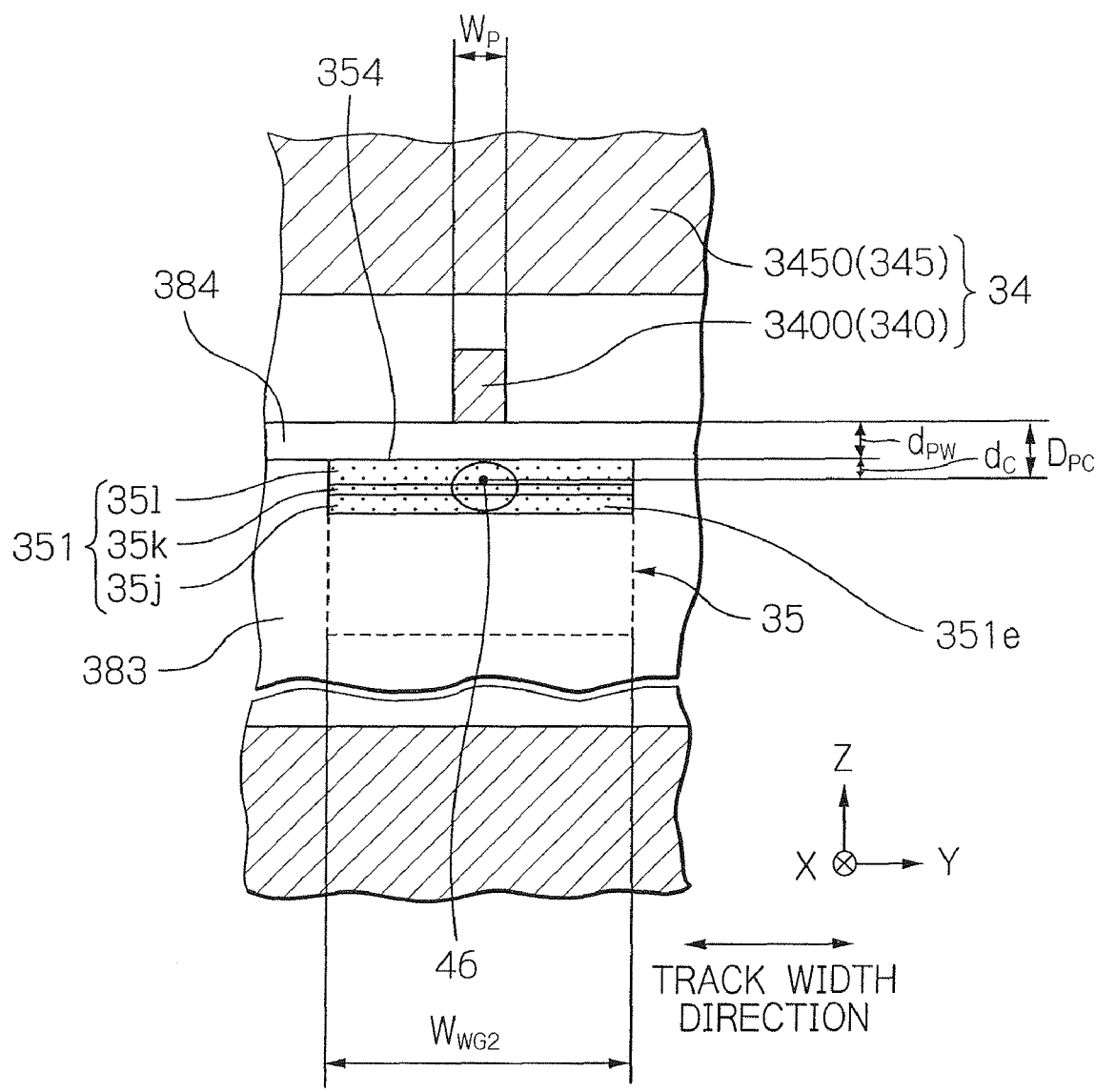
FIG. 4b shows a planar view schematically illustrating the end surfaces of the waveguide and electromagnetic transducer on the head part end surface.

FIGS. 4a1 to 4a4 show views of both end surfaces, a cross-sectional view and a top view schematically illustrating one embodiment of the waveguide 35 according to the present invention. FIG. 4a1 shows the rear-end surface 352 on the light-receiving side, FIG. 4a2 shows a cross-sectional view, taken by ZX plane, of the waveguide 35, FIG. 4a3 shows the end surface 351e on the light-emitting side, and FIG. 4a4 shows a top view of the waveguide 35 when viewed down from above the element-formation surface 2202. Further, FIG. 4b shows a planar view schematically illustrating the end surfaces of the waveguide 35 and electromagnetic transducer 34 on the head part end surface 2210. Furthermore, FIGS. 5a to 5d2 show views of both end surfaces and a cross-sectional view schematically illustrating a comparative example of waveguide. FIG. 5a shows a cross-sectional view, taken by ZX plane, of the waveguide. FIGS. 5b1, 5c1 and 5d1 show rear-end surfaces on the light-receiving side, and FIGS. 5b2, 5c2 and 5d2 show end surfaces on the light-emitting side.

As shown in FIGS. 4a1 to 4a3, the waveguide 35 has a multilayered structure of a plurality of layers (12 layers of waveguide layers 35a to 35l in the present embodiment) in which refractive indexes of layers having a surface contact with each other are different from each other. These plural layers are divided into a plurality of groups (two layer groups 350 and 351 in the present embodiment). In the present embodiment, the layer group 350 has a structure in which nine waveguide layers 35a to 35i are sequentially stacked, and the layer group 351 positioned upon the layer group 350 has a structure in which three waveguide layers 35j to 35l are sequentially stacked. Further, the length from the end surface 352 on the light-receiving side of the waveguide 35 to the end surface on the light-emitting side of one layer group is different from that of the neighboring layer group. When the first layer group is defined as a layer group that has the largest length, the protruded end surface on the light-emitting side of the first layer group includes a center 46 of the light-emitting spot of the laser light propagating through the waveguide 35.

In the present embodiment, the length $L_{351}$ (in X-axis direction) from the rear-end surface 352 on the light-receiving side to the end surface 351e on the light-emitting side of the layer group 351 becomes larger than the length $L_{350}$ (in X-axis direction) from the rear-end surface 352 on the light-receiving side to the end surface 350e on the light-emitting side of the layer group 350. As a result, the end surface 351e is protruded from the end surface 350e. The end surface 351e of the layer group 351, which is the first layer group having the largest length $L_{351}$, reaches the end part end surface 2210, and includes a center 46 of the light-emitting spot of the laser light propagating through the waveguide 35. Here, the layer group 351 lies at the end on the trailing side (+Z side) in the stacking direction (Z-axis direction) within the waveguide 35. Therefore, the center 46 of the light-emitting spot can be positioned more on the trailing side (+Z side) than the center 45 of the light-receiving spot, and thus can be made sufficiently close to the end surface 3400e of the main magnetic pole 3400 on the head part end surface 2210.

Further, as shown in FIG. 4a2, the waveguide 35 of the present embodiment has a multilayered structure in which the waveguide layers 35a, 35c, 35e, 35g, 35i and 35k having the first refractive index $n_{WG1}$ and the waveguide layers 35b, 35d, 35f, 35h, 35j and 35l having the second refractive index $n_{WG2}$ that is higher than the first refractive index $n_{WG1}$ are alternately stacked. Furthermore, the waveguide layers 35a, 35c, 35e, 35g, 35i and 35k with the first refractive index $n_{WG1}$ have layer thicknesses that sequentially become smaller in the stacking direction (+Z direction), while the waveguide layers 35b, 35d, 35f, 35h, 35j and 35l with the second refractive index $n_{WG2}$ have layer thicknesses that sequentially become larger in the stacking direction (+Z direction). As a result, the average refractive index $n_{351}$ of the layer group 351 becomes higher than that the average refractive index $n_{350}$ of the layer group 350, that is, is the highest in the layer groups. By setting the refractive-index distribution in the stacking direction (+Z direction) of the waveguide 35 as described above, it becomes possible that the center 46 of the light-emitting spot is positioned on the end surface 351e of the layer group 351 that has the highest average refractive index. Here, the average refractive index of a layer group is defined as a weighted average value of refractive index of each of waveguide layers that constitutes the layer group, in which the layer thickness of each of the waveguide layers is taken into account. The average refractive indexes $n_{350}$ and $n_{351}$ of the layer groups 350 and 351 are represented as the following expressions (1) and (2), respectively:

$$n_{350}=(t_{35a} \times n_{35a}+t_{35b} \times n_{35b}+ \ldots +t_{35i} \times n_{35i})/(t_{35a}+t_{35b}+ \ldots +t_{35i}) \quad (1)$$

$$n_{351}=(t_{35j} \times n_{35j}+t_{35k} \times n_{35k}+t_{35l} \times n_{35l})/(t_{35j}+t_{35k}+t_{35l}) \quad (2)$$

As a comparative example regarding the waveguide 35, a waveguide 47 having a multilayered structure is shown in FIGS. 5a to 5d2, in which the distances from the end surface on the light-receiving side to the end surfaces on the light-emitting side of constituent layers are equal to one another. The waveguide layers 47a to 47l, which constitute the waveguide 47, have the same thicknesses and refractive indexes as the waveguide layers 35a to 35l that constitute the waveguide 35, respectively. In the case of using the waveguide 47, as shown in FIGS. 5b1 to 5d2, depending on positions of light-receiving spot centers 48, 48' and 48" on the rear-end surface 472 of the waveguide 47, the position of light-emitting spot center on the end surface 470e of the waveguide 47 varies as the positions of reference numerals 49, 49' and 49". In some cases, as shown in FIG. 5c2, there may be two spots having two centers 49'. As just explained, in the waveguide 47, the position of light-emitting spot center on the end surface 470e on the light-emitting side deviates significantly from the intended position due to the slight deviation in position of the light source in relation to the rear-end surface 472 on the light-receiving side. This significant deviation brings about a difficulty that the positional accuracy of the light source in relation to the rear-end surface 472 must be set sufficiently high. Here, the deviation of light-emitting spot center from the intended position is difficult to observe by using a usual microscope, because, during observation, the light-emitting center often makes less contrast with the end surface in a waveguide. Whereas, in the waveguide 35 according to the present invention, it has become evident from experiment that the state in which the light-emitting spot center 46 is positioned within the end surface 351e does not easily be changed, even when the position of light-receiving spot center 45 within the rear-end surface 352 is rather displaced. Therefore, the light-emitting spot center 46 can be stably set to be at the intended position within the end surface 351e, under the condition that the area of rear-end surface 352 is made sufficiently large and thus the optical coupling efficiency between the laser diode 40 and the waveguide 35 is made sufficiently high.

Returning to FIG. 4a2, the length $L_{350}$ of the layer group 350 other than the layer group 351 as the first group is preferably as large as an integral multiple of a pitch in the waveguide 35 of the laser light (waveguide light) propagating within the waveguide 35. Here, the laser light (waveguide light) propagating within the waveguide 35 shows an aspect in which the waveguide light proceeds in waves with a period depending on the shape and size of the waveguide 35. The above-described pitch is equal to this period. The amount of pitch is, for example, 18 μm, which is markedly larger than the wavelength of the waveguide light. This adjustment of the length $L_{350}$ enables the light-emitting spot center 46 to be more surely positioned within the end surface 351e.

Each layer group of the waveguide 35 may have a rectangular parallelepiped shape extended in X-axis direction; or, as shown in FIG. 4a4, may have a portion that tapers in the track width direction (in Y-axis direction) on the head part end surface 2210 side. Further, alternatively, the whole waveguide may be curved within XY plane. For example, a laser diode may be provided on the element-formation surface 2202; thus laser light can be led to the position on the opposed-to-medium surface by using the curved waveguide. In the case of using the curved waveguide with multilayered structure, the length of each of the layer groups is an optical path length along the direction of the laser light propagation from the end surface on the light-receiving side to the end surface on the light-emitting side within XY plane.

According to FIGS. 4a1 to 4a4, the width $W_{WG1}$ in the track width direction (in Y-axis direction) near the rear-end surface 352 of the waveguide 35 may be, for example, in the range approximately from 1 to 200 μm, and the width $W_{WG2}$ in the track width direction (in Y-axis direction) near the end surface 351e of the waveguide 35 may be, for example, in the range approximately from 0.3 to 1 μm. The thickness $T_{WG}$ (in Z-axis direction) may be, for example, in the range approximately from 0.1 to 4 μm, and the total length $H_{WG}$ ($L_{351}$) of the waveguide 35 (in X-axis direction) may be, for example, in the range approximately from 10 to 300 μm.

Further, as shown in FIGS. 4a1 to 4b, both side surfaces 351 and a lower surface 353 of the waveguide 35 have a surface contact with the insulating layer 383 that acts as a clad. And an upper surface 354 of the waveguide 35 has a surface contact with the insulating layer 384. Each of the waveguide layers 35a to 35l constituting the waveguide 35 is formed, for example, by using a sputtering method, of a dielectric material with higher refractive index than the refractive index of constituent material of the insulating layers 383 and 384. For example, in the case that the insulating layers 383 and 384 are formed of $SiO_2$ (silicon dioxide: n=1.5) or $Al_2O_3$ (alumina: n=1.63), each of the waveguide layers 35a to 35l can be formed of, for example, $SiO_xN_y$ (silicon oxynitride: n=1.7-1.85). In the case, the waveguide layers 35a, 35c, 35e, 35g, 35i and 35k can be formed of, for example, $SiO_xN_y$ with the first refractive index $n_{WG1}$=1.73, and further the waveguide layers 35b, 35d, 35f, 35h, 35j and 35l can be formed of, for example, $SiO_xN_y$ with the second refractive index $n_{WG2}$=1.83 (>$n_{WG1}$). The value of refractive index in $SiO_xN_y$ can be controlled by adjusting the composition ratio X and Y appropriately. In fact, the higher the ratio (Y/X) of nitrogen to oxygen is set to be, the higher becomes the refractive index. By forming the waveguide 35 of the above-described material, it is possible to reduce the propagation loss of laser light due to excellent optical characteristics of the material. Further, the waveguide 35 acts as a core, while the insulating layers 383 and 384 function as a clad; thus the total reflection condition is satisfied at the side surfaces 351, the lower surface 353 and the upper surface 354. As a result, more amount of laser light entering the waveguide through the rear-end surface 352 can reach the end surface 351e, which improves the propagation efficiency of the waveguide 35.

Further, as shown in FIG. 4b, on the head part end surface 2210, the end surface 351e of the waveguide 35 (layer group 351) is located on the leading side (−Z side) from the end surface 3400e of the main magnetic pole 3400. Here, $D_{PC}$ is defined as a distance in Z-axis direction between the light-emitting spot center 46, positioned on the end surface 351e, of the laser light emitted from the end surface 351e and the end surface 3400e of the main magnetic pole 3400. In thermally-assisted magnetic recording, it is significantly important to set the distance $D_{PC}$ to be sufficiently small and thus control the positional relation between the distribution of write field generated from the end surface 3400e and the distribution of anisotropic magnetic field of the magnetic recording layer in the magnetic disk. The distance $D_{PC}$ is expressed as follows:

$$D_{PC} = d_{PW} + d_C \qquad (1)$$

where $d_{PW}$ is a distance between the main magnetic pole 3400 and the waveguide 35 on the head part end surface 2210, and $d_C$ is a distance between the light-emitting spot center 46 and the upper surface 354 of the waveguide 35. The distance $d_{PW}$ is equivalent to the layer thickness of the insulating layer 384. Therefore, the amount of distance $d_{PW}$ required for the insulating layer 384 to function as a clad must be secured at the very least. From that, it is understood that the distance $D_{PC}$ can be controlled to a very small value by setting the distance $d_C$ to be a sufficiently small value with use of the waveguide 35 according to the present invention. Here, the distance $d_C$ can be set to be, for example, approximately 100 to 500 nm, and the distance $D_{PC}$ can be controlled to, for example, approximately 120 to 700 nm.

Further, also as shown in FIG. 4b, the end surface 3400e of the main magnetic pole 3400 has a rectangular (square) shape; alternatively, may have a trapezoidal shape. The above-described width $W_p$ in the track width direction (Y-axis direction) of the main magnetic pole 3400 (end surface 3400e) is equivalent to the length of the trailing edge or the leading edge of the end surface 3400e where writing data is performed, and determines the width of a track formed on the magnetic recording layer of the magnetic disk. The width $W_p$ is, for example, in the range of approximately 0.05 to 0.5 µm.

The number of stacked layers of the waveguide 35 (the number of waveguide layers) is not limited to twelve; the waveguide 35 could be constituted by two or more of waveguide layers. In the case, each of the first layer group and the other layer group(s) preferably includes two or more of waveguide layers. Thereby, there can be more improved the positional accuracy of the light-emitting spot center 46.

FIGS. 6a1 to 6a3 and FIGS. 6b1 to 6b3 show views of both end surfaces and cross-sectional views schematically illustrating other embodiments of waveguide according to the present invention. FIGS. 6a1 and 6b1 show rear-end surfaces on the light-receiving side, FIGS. 6a2 and 6b2 show cross-sections taken by ZX plane of the waveguide, and FIGS. 6a3 and 6b3 show end surfaces on the light-emitting side.

As shown in FIGS. 6a1 to 6a3, a waveguide 55 is divided into the first layer group 553 that has the largest length in X-axis direction and the other layer groups (three layer groups 550, 551 and 552 in the present embodiment). In the waveguide 55, waveguide layers (55a, 55c, 55e, 55g, 55i and 55k in the present embodiment) that have the first refractive index $n_{WG1}$ and waveguide layers (55b, 55d, 55f, 55h, 55j and 55l in the present embodiment) that have the second refractive index $n_{WG2}$ higher than the first refractive index $n_{WG1}$ are alternately stacked. Further, the waveguide layers 55a, 55c, 55e, 55g, 55i and 55k have layer thicknesses decreased sequentially, whereas the waveguide layers 55b, 55d, 55f, 55h, 55j and 55l have layer thicknesses increased sequentially.

The first layer group 553 includes the waveguide layers 55j, 55k and 55l, and the layer groups 550, 551 and 552 include the waveguide layers 55a, 55b and 55c, the waveguide layers 55d, 55e and 55f, and the waveguide layers 55g, 55h and 55i, respectively. As a result, the average refractive index $n_{553}$ of the first layer group 553 is higher than any of the average refractive indexes $n_{550}$, $n_{551}$ and $n_{552}$ of the other layer groups 550, 551 and 552. Then, the average refractive indexes $n_{552}$, $n_{551}$ and $n_{550}$ become lower sequentially from the first layer group 553 side ($n_{550} < n_{551} < n_{552} < n_{553}$). Further, the length $L_{553}$ of the first layer group 553 is larger than any of the lengths $L_{550}$, $L_{551}$ and $L_{552}$ of the other layer groups 550, 551 and 552. Then, the lengths $L_{552}$, $L_{551}$ and $L_{550}$ become smaller sequentially from the first layer group 553 side. Here, each of the lengths $L_{550}$, $L_{551}$ and $L_{552}$ of the layer groups 550, 551 and 552 is preferably as large as an integral multiple of a pitch in the waveguide 55 of the laser light (waveguide light) propagating within the waveguide 55. Further, the end surface 553e of the first layer group 553 reaches the head part end surface 2210.

As described above, the waveguide 55 has a plurality of steps in the stacking direction (Z-axis direction) so that the waveguide is narrowed down more as it gets closer to the head part end surface 2210. The more the number of steps is, the more decreased is the total propagation loss at the interfaces between layer groups. As a result, the plurality of steps enables the propagation loss of the whole waveguide to be more reduced. Further, the light-emitting spot center 57 can be stably positioned within the end surface 553e, even when the position of light-receiving spot center 56 within the rear-end surface 554 is rather displaced.

As shown in FIGS. 6b1 to 6b3, a waveguide 60 is divided into the first layer group 601 that has the largest length in X-axis direction and layer groups 600 and 602 that sandwich the first layer group 601 therebetween. In the waveguide 60, waveguide layers (60a, 60c, 60e, 60g, 60i and 60k in the present embodiment) that have the first refractive index $n_{WG1}$ and waveguide layers (60b, 60d, 60f, 60h and 60j in the present embodiment) that have the second refractive index $n_{WG2}$ higher than the first refractive index $n_{WG1}$ are alternately stacked. Further, the waveguide layers 60a, 60c and 60e have layer thicknesses decreased sequentially, whereas the waveguide layers 60g, 60i and 60k have layer thicknesses increased sequentially. While, the waveguide layers 60b, 60d and 60f have layer thicknesses increased sequentially, whereas the waveguide layers 60f, 60h and 60j have layer thicknesses decreased sequentially. In the waveguide layers having the second refractive index $n_{WG2}$, the largest is the thickness of the waveguide layer 60f. The thicknesses of these waveguide layers 60a, 60b, 60c, . . . , and 60k can be set to be, for example, 300, 28, 247, 82, 146, 205, 146, 82, 247, 28 and 300 µm, respectively.

The first layer group 601 includes the waveguide layers 60e, 60f and 60g, and the layer groups 600 and 602 include the waveguide layers 60a, 60b, 60c and 60d, and the waveguide layers 60h, 60i, 60j and 60k, respectively. As a result, the average refractive index $n_{601}$ of the first layer group 601 that includes the waveguide layer 60f is higher than any of the average refractive indexes $n_{600}$ and $n_{602}$ of the other layer groups 600 and 602. It is also possible to set $n_{600}$ to be equal to $n_{602}$ ($n_{600} = n_{602} < n_{603}$) by making the layer thickness distribution in the stacking direction (Z-axis direction) symmetrized with the waveguide layer 60f as a center. Further, the length $L_{601}$ of the first layer group 601 is larger than any of the lengths $L_{600}$ and $L_{602}$ of the other layer groups 600 and 602. It is also possible to set $L_{600}$ to be equal to $L_{602}$. Here, each of the lengths $L_{600}$ and $L_{602}$ of the layer groups 600 and 602 is preferably as large as an integral multiple of a pitch in the waveguide 60 of the waveguide light propagating within the waveguide 60. Further, the end surface 601e of the first layer group 601 reaches the head part end surface 2210.

Under the above-described structure of the waveguide 60, the light-emitting spot center 62 can be stably positioned within the end surface 601e, even when the position of light-receiving spot center 61 within the rear-end surface 603 is rather displaced. In the case of using the waveguide 60 for thermally-assisted magnetic recording, the main magnetic pole 3400 is disposed adjacent to the end surface 601e of the first layer group 601. Therefore, the lower end of the main magnetic pole 3400 is required to be positioned on the lower side (on the leading side: −Z side) from the upper surface 604 of the waveguide 60 (layer group 602). In this case, during manufacturing the head, the level of stacking the waveguide becomes equivalent to the level of stacking the main magnetic pole. On the contrary, in the case of using the waveguide 35 (FIGS. 4a1 to 4a3) or the waveguide 55 (FIGS. 6a1 to 6a3) together with the main magnetic pole, one of the waveguide or the main magnetic pole is formed, then is covered with alumina or the like, and is planarized by using, for example, CMP, and after that, the other of the waveguide or the main magnetic pole can be formed with a predetermined positional accuracy obtained by using a photolithography method.

Hereinafter, there will be explained practical examples of propagating laser light through multilayered waveguides according to the present invention, and comparative examples.

The simulation analysis experiments of propagating laser light through multilayered waveguides according to the present invention were performed by using a three-dimensional light-waveguide simulator. Laser light that entered the waveguide was a Gaussian beam with a wavelength $\lambda_L$ of 650 nm, having TM polarization (in which the oscillation direction of electric field of the laser light is perpendicular to the layer surface of the waveguide, that is, in Z-axis direction). The output power of the laser light was 10 mW. Light use efficiency of the waveguide was determined by providing the laser light to a target waveguide and measuring the intensity of light emitted from the waveguide. The light use efficiency of a waveguide was calculated by using the expression: $I_{OUT}/I_{IN}$ (×100), where $I_{IN}$ is the intensity of laser light provided into the end surface on the light-receiving side of the waveguide, and $I_{OUT}$ is the intensity of laser light emitted from the end surface on the light-emitting side of the waveguide.

FIGS. 7a to 7c2 show schematic views illustrating the structures of waveguides 35 and 55 used for practical examples 1 and 2. And FIGS. 8a1 to 8c3 show schematic views illustrating the structures of waveguides 65, 70 and 75 used for comparative examples 1 to 3.

The waveguide 35 (FIG. 7a) of practical example 1 had the same structure as that in the embodiment shown in FIGS. 4a1 to 4a3, except that the waveguide 35 (FIG. 7a) was not tapered in the track width direction (Y-axis direction) and had a constant width in the track width direction (4 μm). The layer thicknesses $t_{35a}$ to $t_{35l}$ of the waveguide layers 35a to 35l of the waveguide 35 were 300, 28, 247, 82, 194, 139, 139, 195, 84, 253, 28 and 311 nm, respectively, as shown in FIG. 7c1. Therefore, the total thickness of the waveguide 35, that is, the thickness on the light-receiving side (FIG. 7c1) was 2.0 μm. The first layer group 351 was formed of three waveguide layers 35j to 35l, as shown in FIG. 7c2. Therefore, the thickness on the light-emitting side of the waveguide 35 was 0.592 μm. Under the just-described structure, a light-emitting spot center was observed within the end surface 351e when laser light entered the waveguide through the rear-end surface 352.

The length $L_{351}$ of the first layer group 351 in X-axis direction was 250 μm. The length $L_{350}$ of the second layer group 350 in X-axis direction was 198 μm. Therefore, the length of the portion with a thickness of 0.592 μm on the light-emitting side of the waveguide 35 was 52 μm (=$L_{351}$−$L_{350}$). The pitch of the waveguide light was 18 μm; that is, the length $L_{350}$ was equivalent to eleven pitches. Further, each of widths $W_{WG1}$ and $W_{WG2}$ in the track width direction (Y-axis direction) of the waveguide 35 was 4 μm. The waveguide layers 35a, 35c, 35e, 35g, 35i and 35k were formed of $SiO_XN_Y$ having the first refractive index $n_{WG1}$=1.73, and the waveguide layers 35b, 35d, 35f, 35h, 35j and 35l were formed of $SiO_XN_Y$ having the second refractive index $n_{WG2}$=1.83. The insulating layers 383 and 384 acting as a clad covering the waveguide 35 were formed of $Al_2O_3$ (alumina: n=1.65).

The waveguide 55 (FIG. 7b) of practical example 2 has the same structure as that in the embodiment shown in FIGS. 6a1 to 6a3. The lengths $L_{550}$, $L_{551}$, $L_{552}$ and $L_{553}$ in X-axis direction of the layer groups 550 to 552 and the first layer group 553, which constitute the waveguide 55, were 72, 127, 171 and 250 μm, respectively. The other sizes of the waveguide 55, the layer thickness (FIGS. 7c1 and 7c2) and refractive indexes of each waveguide layer, and the surrounding clad were the same as those in the waveguide 35 of practical example 1. Under the just-described structure, a light-emitting spot center was observed within the end surface 553e when laser light entered the waveguide through the rear-end surface 552.

The waveguide 65 (FIGS. 8a1 to 8a3) of comparative example 1 had a structure equivalent to only the first layer group 351 of the waveguide 35 (FIG. 7a) of practical example 1. That is, the waveguide 65 had a multilayered structure with a total thickness of 0.592 μm, in which the waveguide layers 35j, 35k and 35l were stacked sequentially.

The waveguide 70 (FIGS. 8b1 to 8b3) of comparative example 2 had the same size as that of the whole first layer group 351 of the waveguide 35 (FIG. 7a) of practical example 1, and was formed of a single material of $SiO_XN_Y$ having the second refractive index $n_{WG2}$=1.83. Further, the monolayer structure of the waveguide 70 had a total thickness of 0.592 μm.

The waveguide 75 (FIGS. 8c1 to 8c3) of comparative example 3 had the same shape and size as those of the whole waveguide 35 (FIG. 7a) of practical example 1, and was formed of a single material of $SiO_XN_Y$ having the second refractive index $n_{WG2}$=1.83. Further, the waveguide 75 had a structure in which a thicker portion has a thickness of 2.0 μm and the other protruded portion has a thickness of 0.592 μm.

Table 1 shows the results of the simulation experiments of light use efficiency in practical examples 1 and 2, and in comparative examples 1 to 3.

TABLE 1

|  | Light use efficiency (%) |
| --- | --- |
| Practical example 1 | 74.8 |
| Practical example 2 | 78.2 |
| Comparative example 1 | 50.0 |
| Comparative example 2 | 44.7 |
| Comparative example 3 | 32.1 |

As shown in Table 1, in practical example 1, high light use efficiency of 74.8% was obtained. This value is sufficient, and is more than double the value (32.1%) of comparative example 3, in which used was the waveguide 75 that was formed of a single material and had the same shape and size as those of the whole waveguide 35 of practical example 1. Further, the light use efficiency (50.0%) of comparative example 1, in which used was the waveguide 65 having a structure equivalent to only the first layer group 351, is higher than the light use efficiency (44.7%) of comparative example 2, in which used was the waveguide 70 having the same size as that of the whole first layer group 351. This result shows an effect due to the multilayered structure. However, the light use efficiency (74.8%) of practical example 1 is almost one-and-a-half times higher than that of comparative example 1. From this result, it is understood that the structure of the present invention, in which the multilayer of waveguide layers is divided into a plurality of layer groups and the end surface of the first group on the light-emitting side is protruded, indeed produces the remarkable effect. Here, the light use efficiency (78.2%) of practical example 2 is higher than that of practical example 1. This result shows that a plurality of steps in the stacking direction (Z-axis direction) in the waveguide enables the propagation loss of the whole waveguide to be more lowered.

From the above-described examples, according to the present invention, it is understood that there can be provided a waveguide with an improved light use efficiency, in which the light-emitting spot center of the light propagating through the waveguide can be stably provided at the intended position. Further, there can be provided a thermally-assisted magnetic recording head in which the light-emitting spot center of the light propagating through the waveguide can be provided sufficiently adjacent to the main magnetic pole, by utilizing the above-described waveguide according to the present invention.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising, in an element-formation surface of a substrate: a write head element for writing data into a magnetic recording medium; and a waveguide for guiding light to the magnetic recording medium side,
    said waveguide comprising a multilayered structure in which refractive indexes of layers having a surface contact with each other are different from each other,
    the multilayered structure being divided into a plurality of groups, and a length from an end surface on light-receiving side of the waveguide to an end surface on light-emitting side of one group being different from that of the neighboring group, and
    a protruded end surface on the light-emitting side of a first group defined as a group that has the largest length including a center of a light-emitting spot of light propagating through the waveguide.

2. The thermally-assisted magnetic recording head as claimed in claim 1, wherein an average refractive index of the first group is the highest in average refractive indexes of the plurality of groups.

3. The thermally-assisted magnetic recording head as claimed in claim 1, wherein the layers having a first refractive index and the layers having a second refractive index that is higher than the first refractive index are alternately stacked.

4. The thermally-assisted magnetic recording head as claimed in claim 1, wherein a length of a group other than the first group is as large as an integral multiple of a pitch of the light in the waveguide.

5. The thermally-assisted magnetic recording head as claimed in claim 1, wherein the write head element comprises a magnetic pole that generates write magnetic field and reaches an opposed-to-medium surface, and the first group lies at an end in stacking direction on the magnetic pole side within the waveguide.

6. The thermally-assisted magnetic recording head as claimed in claim 5, wherein the multilayered structure is divided into the first group and a second group, and an average refractive index of the first group is higher than an average refractive index of the second group.

7. The thermally-assisted magnetic recording head as claimed in claim 6, wherein the first group has a structure in which a layer having a second refractive index, a layer having a first refractive index that is lower than the second refractive index, and a layer having the second refractive index are sequentially stacked.

8. The thermally-assisted magnetic recording head as claimed in claim 5, wherein the multilayered structure is divided into the first group and the other plurality of groups, an average refractive index of the first group is higher than any of average refractive indexes of the other plurality of groups, and lengths of the other plurality of groups become smaller sequentially from the first group side.

9. The thermally-assisted magnetic recording head as claimed in claim 1, wherein an end surface on light-emitting side of the first group reaches an opposed-to-medium surface.

10. The thermally-assisted magnetic recording head as claimed in claim 1, wherein a light source is provided on an opposite side to an opposed-to-medium surface of the head, and an end surface on light-receiving side of the waveguide reaches an end surface of the head opposite to the opposed-to-medium surface, and is provided in a position where a light emitted from the light source can be received.

11. A head gimbal assembly comprising a suspension and a thermally-assisted magnetic recording head as claimed in claim 1 fixed on the suspension.

12. A magnetic recording apparatus comprising:
    at least one head gimbal assembly comprising a suspension and a thermally-assisted magnetic recording head fixed on the suspension; and
    at least one magnetic recording medium,
    the thermally-assisted magnetic recording head comprising, in an element-formation surface of a substrate: a write head element for writing data into the magnetic recording medium; and a waveguide for guiding light to the magnetic recording medium side,
    said waveguide comprising a multilayered structure in which refractive indexes of layers having a surface contact with each other are different from each other,
    the multilayered structure being divided into a plurality of groups, and a length from an end surface on light-receiving side of the waveguide to an end surface on light-emitting side of one group being different from that of the neighboring group,
    a protruded end surface on the light-emitting side of a first group defined as a group that has the largest length including a center of a light-emitting spot of light propagating through the waveguide, and
    a recording and light-emission control circuit for controlling emission operation of the light propagating through the waveguide, and for controlling write operation that the thermally-assisted magnetic recording head performs to the at least magnetic recording medium.

* * * * *